United States Patent
Lee et al.

(10) Patent No.: US 10,850,443 B2
(45) Date of Patent: Dec. 1, 2020

(54) MANUFACTURING METHOD FOR THREE-DIMENSIONAL PRODUCT HAVING UNIFORM PROPERTY USING SELECTIVE LASER SINTERING 3D PRINTER

(71) Applicants: HYUNDAI MOTOR COMPANY, Seoul (KR); KIA MOTORS CORPORATION, Seoul (KR)

(72) Inventors: Hee Joon Lee, Seoul (KR); Young Ho Choi, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 245 days.

(21) Appl. No.: 15/695,640

(22) Filed: Sep. 5, 2017

(65) Prior Publication Data

US 2018/0178445 A1  Jun. 28, 2018

(30) Foreign Application Priority Data

Dec. 28, 2016 (KR) .......... 10-2016-0181653

(51) Int. Cl.
| | | |
|---|---|---|
| *B33Y 10/00* | (2015.01) | |
| *B29C 64/153* | (2017.01) | |
| *C03C 11/00* | (2006.01) | |
| *C08K 7/28* | (2006.01) | |
| *B29C 64/314* | (2017.01) | |
| *C03C 14/00* | (2006.01) | |

(Continued)

(52) U.S. Cl.
CPC .......... *B29C 64/153* (2017.08); *B29C 64/314* (2017.08); *C03C 11/002* (2013.01); *C03C 14/008* (2013.01); *C08K 7/28* (2013.01); *B29C 64/218* (2017.08); *B29K 2105/165* (2013.01); *B29K 2105/251* (2013.01); *B29K 2509/08* (2013.01); *B33Y 10/00* (2014.12); *B33Y 70/00* (2014.12)

(58) Field of Classification Search
CPC ... B29C 64/153; B29C 64/314; B29C 64/218; B33Y 10/00; B33Y 70/00; B33Y 80/00
USPC ........................................................ 264/497
See application file for complete search history.

(56) References Cited

U.S. PATENT DOCUMENTS

| | | | | |
|---|---|---|---|---|
| 5,733,497 A | * | 3/1998 | McAlea | B29C 39/003 264/113 |
| 2010/0207288 A1 | * | 8/2010 | Dini | B28B 7/465 264/33 |

(Continued)

FOREIGN PATENT DOCUMENTS

| | | |
|---|---|---|
| KR | 10-0399164 B1 | 12/2003 |
| KR | 10-2015-0133328 A | 11/2015 |

*Primary Examiner* — Jeffrey M Wollschlager
*Assistant Examiner* — Xue H Liu
(74) *Attorney, Agent, or Firm* — McDonnell Boehnen Hulbert & Berghoff LLP

(57) ABSTRACT

The present invention provides a method of manufacturing a three-dimensional product having uniform mechanical properties using an SLS 3D printer including the steps of: preparing a mixed powder material by mixing resin powder and glass bubbles, wherein the specific gravity of the glass bubbles is from about 0.8 to about 1.2 times that of the resin powder; supplying the mixed powder material to the 3D printer using a roller; and selectively sintering the mixed powder material by irradiating the powder material using a laser based on 3D data of the product to be manufactured.

6 Claims, 1 Drawing Sheet

(51) Int. Cl.
  *B33Y 70/00*    (2020.01)
  *B29C 64/218*   (2017.01)
  *B29K 105/16*   (2006.01)
  *B29K 509/08*   (2006.01)
  *B29K 105/00*   (2006.01)

(56) References Cited

U.S. PATENT DOCUMENTS

2013/0267630 A1* 10/2013 Han .................... C08K 7/28
                                                523/219
2016/0256925 A1   9/2016 Heikkila

* cited by examiner

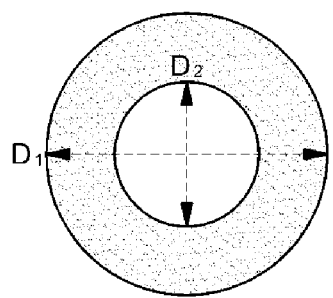

MANUFACTURING METHOD FOR THREE-DIMENSIONAL PRODUCT HAVING UNIFORM PROPERTY USING SELECTIVE LASER SINTERING 3D PRINTER

CROSS-REFERENCE TO RELATED APPLICATION

This application claims under 35 U.S.C. § 119(a) the benefit of and priority to Korean Patent Application No. 10-2016-0181653 filed on Dec. 28, 2016, the entire contents of which are incorporated herein by reference.

BACKGROUND

(a) Technical Field

The present disclosure relates to a method of manufacturing a three-dimensional product having a uniform property using a selective laser sintering ("SLS") 3D printer.

(b) Background Art 3D printing—a technology of molding a three-dimensional structure product—has the advantages of rapidly making a three-dimensional structure and fabricating a shape that is generally very difficult to be assembled and disassembled. Full-scale studies on 3D printing have been conducted for quite some time now. Nevertheless, until recently, there was a limitation in what materials were capable of use in 3D printing and the printing equipment was expensive. Therefore, 3D printing was used only in limited areas such as production of space-related components or production of trial manufactured goods such as cars However, use of 3D printing technology is expanding into a wide variety of fields.

3D printing technology may be classified into fused deposition modeling ("FDM") methods using a solid-type material, stereolithography apparatus ("SLA") methods using a liquid-type material, and selective laser sintering ("SLS") methods using a powder-type material.

In the FDM method, plastic is typically the material used. Thin plastic threads called filaments are dissolved by passing through a heater and then stacked from the bottom to the top. FDM printers are less expensive than SLA or SLS printers, but there is a disadvantage in that the material is limited to the plastic and the surface of the printed matter is rough.

In the SLA method, only necessary parts are solidified by irradiating a water bath containing a photocurable resin (liquid plastic) using a laser beam, causing the resin solidify. The surface of the printed matter is smoother than when using the FDM method, but there is a disadvantage in that the material is limited to the photocurable resin and the printed products are less durable than those made using the FDM method.

The SLS method is similar to the SLA method in that a laser beam is used. In the SLS method, a three-dimensional structure is fabricated by forming a uniform layer using a powder-type material (e.g., plastic powder, sand, metal, and the like) and then selectively sintering the powder layer using the laser. The SLS method is advantageous in that various materials may be used and recycling of the material is possible. However, when using resin powder as the starting material in the SLS method, the mechanical properties of the printed product are insufficient compared to a conventional inorganic-reinforced plastic.

To solve this problem, inorganic materials (e.g., glass beads, glass bubbles, glass staple fibers, etc.) may be mixed and used with the powder, but positional dispersion of the inorganic material occurs due to a difference in specific gravity between the powder and the inorganic material (i.e., the material having the higher specific gravity falls down) resulting in different physical properties of the final product at different positions.

Accordingly, when using an inorganic material to improve the mechanical properties of an SLS 3D printed product, it is necessary to improve dispersion of the inorganic material and stability of the dispersion during printing.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure addresses the above-described problems associated with prior art.

The present disclosure is directed to providing a manufacturing method for a product having uniform properties throughout using an SLS 3D printer.

In one aspect, the present disclosure describes a manufacturing method for a three-dimensional product having uniform properties using an SLS 3D printer including the steps of: preparing a mixed powder material by mixing resin powder and glass bubbles; supplying the mixed powder material to the SLS 3D printer using a roller; and selectively sintering the mixed powder material by irradiating the material using a laser according to 3D data of the product to be manufactured; wherein the specific gravity of the glass bubble is 0.8 to 1.2 times larger than that of the resin powder.

In a preferred embodiment, the specific gravity of the glass bubbles may be adjusted by adjusting the ratio of the outer diameter to the inner diameter of the glass bubble. Preferably, the specific gravity of the glass bubbles may be from about 0.9 to about 1.1 times that of the resin powder.

In another preferred embodiment, the glass bubbles may comprise a mixture of glass bubbles having the same outer diameter as the resin powder and glass bubbles having an outer diameter of from about ⅓ to about ½ of the outer diameter of the resin powder.

In still another preferred embodiment, the resin powder may be selected from the group consisting of nylon 6, nylon 66, polypropylene, acrylonitrile butadiene styrene ("ABS"), polylactic acid ("PLA"), polyethylene chloride ("PC"), and polymethyl metacrylate ("PMMA") and the outer diameter of the resin powder may be 2 to 200 μm.

Use of the above described SLS 3D printing manufacturing method results in a product having uniform properties and improved mechanical properties throughout.

By using glass bubbles having an outer diameter smaller than that of the resin powder, it is possible to minimize the creation of pores of resin powder and minimize generation of holes or pockets after irradiating the material with a laser.

Other aspects and preferred embodiments of the disclosure are discussed below.

It is understood that the term "vehicle" or "vehicular" or other similar term as used herein is inclusive of motor vehicles in general such as passenger automobiles including sports utility vehicles ("SUV"), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure are described in detail with reference to certain exemplary embodiments thereof illustrated in the accompanying drawings which are given hereinbelow by way of illustration only, and thus are not limitative of the present invention, and wherein:

FIG. 1 illustrates an outer diameter D1 and an inner diameter D2 of a glass bubble.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the FIGURES, reference numbers refer to the same or equivalent parts of the present invention throughout the several FIGURES of the drawing.

DETAILED DESCRIPTION

Hereinafter reference is made in detail to various embodiments of the present disclosure, examples of which are illustrated in the accompanying drawings and described below. While exemplary embodiments are described, it will be understood that present description is not intended to limit the disclosure to those exemplary embodiments. On the contrary, the disclosure is intended to cover not only the exemplary embodiments, but also various alternatives, modifications, equivalents and other embodiments, as defined by the appended claims.

The present disclosure provides a method of manufacturing a three-dimensional product having uniform properties using a selective laser sintering (SLS) 3D printer, including the steps of: preparing a mixed powder material by mixing resin powder and glass bubbles; supplying the mixed powder material to the 3D printer using a roller; and selectively sintering the mixed powder material by irradiating the powder using a laser according to 3D data of the product to be manufactured; wherein the specific gravity of the glass bubbles is from about 0.8 to about 1.2 times larger than that of the resin powder.

Hereinafter, the method of manufacturing the three-dimensional product having uniform properties using the SLS 3D printer according to an exemplary embodiment is described in more detail.

To address the positional dispersion problem, the method provides for adjusting the specific gravity of the glass bubbles equal to that of the base powder by controlling the ratio of the outer diameter and the inner diameter of the glass bubbles. This allows the physical properties of the printed product to be uniform throughout.

The specific gravity of the glass bubble may be controlled by adjusting the ratio of the outer diameter and the inner diameter. As illustrated in FIG. 1, the outer diameter of the glass bubble means the entire diameter of the glass bubble and the inner diameter means a diameter of an inner empty space surrounded by the glass. As the inner diameter decreases relative to the outer diameter of the glass bubble, the glass thickness and the specific gravity increase. On the other hand, as the inner diameter increases relative to the outer diameter, the thickness and specific gravity decrease.

The specific gravity of the glass bubble material is preferably 0.8 to 1.2 times, and more preferably 0.9 to 1.1, times larger than that of the resin powder. If the specific gravity of the glass bubble is less than 0.8 of that of the resin, the outer thickness of the glass bubble is undesirably thin, and the glass bubble may be broken during milling, molding, and transferring, or the impact strength of the product may be degraded. When the specific gravity of the glass bubble is more than 1.2 times of that of the resin, dispersion is insufficient in the transfer preparation process for 3D printing, and thus the mechanical properties of the printed matter may not be uniform.

The glass bubble material used in the example embodiment of the manufacturing method may comprise a mixture of glass bubbles having different outer diameters.

In one embodiment, the glass bubble material may comprise a mixture of glass bubbles having the same outer diameter as the outer diameter of the resin powder and glass bubbles having an outer diameter of from about ⅓ to about ½ of the outer diameter of the resin powder. By using glass bubbles having an outer diameter smaller than that of the resin powder, it is possible to minimize empty spaces between resin powder and minimize generation of holes or pockets after irradiating the material with a laser. While the type of resin powder used is not limited, in an example embodiment, the resin powder is selected from the group consisting of nylon 6, nylon 66, polypropylene, ABS, PLA, PC, and PMMA.

The outer diameter of the resin powder may be from about 2 to about 200 μm, preferably from about 10 to about 100 μm, and more preferably from about 25 to about 55 μm. If the outer diameter of the resin powder is less than 2 μm, the powder grinding process is expensive and time-consuming, and the resin powder material is difficult to handle due to static electricity generated during molding and preparing processes. If the outer diameter of the resin powder is more than 200 μm, the laser irradiation time needed for melting and output increases and the surface quality of the printed product suffers.

The resin powder also may selectively include a compatibilizing agent and a coupling agent on the surface in order to improve adhesion strength between the resin and the surface between the resin powder and the glass bubbles. In an example embodiment, the compatibilizing agent may be a modified maleic anhydride, and the coupling agent may be a silane-based coupling agent.

In a further example embodiment of the manufacturing method according to the present disclosure, an auxiliary reinforcing agent (including, for example, carbon black, carbon nanotubes ("CNT"), glass fiber or the like) may be additionally powdered and added to the resin-glass mixture. Addition of the reinforcing agent may further enhance the mechanical properties of the printed product compared to conventional materials. The auxiliary reinforcing agent may be added in amounts from about 0.5 to about 5 parts by weight and preferably from about 1 to about 3 parts by weight. When there is too little auxiliary reinforcing agent, the reinforcing effect is not exhibited. When the amount of the auxiliary reinforcing agent is too high, it is difficult to maintain dispersion due to a difference in specific gravity between the auxiliary reinforcing agent and the resin powder.

Hereinafter, non-limiting example embodiments are described in detail.

EXAMPLES

Examples 1 to 15

A mixed powder obtained by mixing glass bubbles having an outer diameter and an inner diameter as illustrated in Table 1 below with resin powder was used as the starting for an SLS 3D printer to prepare a component.

The resin powder was nylon PA6 in Examples 1 to 8, nylon PA66 in Examples 9 and 10, polypropylene (PP) in Example 11, ABS in Example 12, PC in Example 13, PMMA in Example 14, and PLA in Example 15.

Comparative Examples 1 to 7

A mixed powder obtained by mixing glass bubbles having an outer diameter and an inner diameter as illustrated in Table 1 below with resin powder was used as the starting material for an SLS 3D printer to prepare a component.

The resin powder was nylon PA6 in Comparative Examples 1 to 5 and nylon PA66 in Comparative Examples 6 and 7.

Test Example

The roughness, the specific gravity of upper and lower ends, and the tensile strength MPa of upper and lower ends of a three-dimensional component manufactured according to the Examples and Comparative Examples were measured and are set forth in Table 1 below.

The roughness of the component was indicated as roughness numbers for the surface roughness using the KS standard divided into five ranges of N1 to N4, N5 to N7, N8 to N9, N10 to N11, and N12. Higher numbers indicate a greater degree of surface roughness.

TABLE 1

| Classification | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Outer diameter of resin powder | | 40 | 30 | 50 | 60 | 20 | 40 | 30 | 50 | 40 | 30 | 40 | 30 |
| Glass bubble 1 | Outer diameter ($D_1$, μm) | 40 | 30 | 50 | 60 | 20 | 40 | 30 | 50 | 40 | 30 | 40 | 30 |
| | Inner diameter ($D_2$, μm) | 33.2 | 24.9 | 41.5 | 49.8 | 16.6 | 33.2 | 24.9 | 41.5 | 32.8 | 24.6 | 34.9 | 25.5 |
| Glass bubble 2 | Outer diameter ($D_1$, μm) | — | — | — | — | — | 20 | 15 | 25 | — | — | — | — |
| | Inner diameter ($D_2$, μm) | — | — | — | — | — | 16.6 | 12.4 | 20.7 | — | — | — | — |
| Specific gravity of resin powder | | 1.13 | 1.13 | 1.13 | 1.13 | 1.13 | 1.13 | 1.13 | 1.13 | 1.24 | 1.24 | 0.91 | 1.05 |
| Specific gravity of glass bubble 1 | | 1.12 | 1.15 | 1.13 | 1.14 | 1.13 | 1.12 | 1.15 | 1.13 | 1.20 | 1.22 | 0.91 | 1.05 |
| Specific gravity of glass bubble 2 | | — | — | — | — | — | 1.12 | 1.15 | 1.13 | — | — | — | — |
| Roughness of 3D printing component | | N6 | N7 | N6 | N6 | N7 | N6 | N7 | N6 | N7 | N7 | N6 | N7 |
| Upper end of 3D printing component | Specific gravity | 1.10 | 1.15 | 1.13 | 1.13 | 1.12 | 1.12 | 1.15 | 1.14 | 1.20 | 1.22 | 0.92 | 1.05 |
| | Tensile strength | 48 | 50 | 51 | 50 | 49 | 52 | 54 | 53 | 56 | 57 | 31 | 31 |
| Lower end of 3D printing component | Specific gravity | 1.12 | 1.15 | 1.14 | 1.15 | 1.14 | 1.12 | 1.14 | 1.13 | 1.21 | 1.22 | 0.91 | 1.06 |
| | Tensile strength | 48 | 50 | 52 | 51 | 50 | 53 | 54 | 53 | 58 | 57 | 32 | 30 |

| Classification | | Example 13 | Example 14 | Example 15 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Outer diameter of resin powder | | 40 | 50 | 40 | 40 | 40 | 40 | 40 | 40 | 40 | 40 |
| Glass bubble 1 | Outer diameter ($D_1$, μm) | 40 | 50 | 40 | 40 | 40 | 40 | 40 | 40 | 40 | 40 |
| | Inner diameter ($D_2$, μm) | 32.8 | 41.2 | 32.4 | 20 | 30 | 32 | 38 | 36 | 20 | 30 |
| Glass bubble 2 | Outer diameter ($D_1$, μm) | — | — | — | — | — | — | — | — | — | — |
| | Inner diameter ($D_2$, μm) | — | — | — | — | — | — | — | — | — | — |
| Specific gravity of resin powder | | 1.22 | 1.19 | 1.25 | 1.13 | 1.13 | 1.13 | 1.13 | 1.13 | 1.24 | 1.24 |
| Specific gravity of glass bubble 1 | | 1.22 | 1.19 | 1.25 | 1.38 | 1.28 | 1.27 | 1.20 | 1.22 | 1.41 | 1.36 |
| Specific gravity of glass bubble 2 | | — | — | — | — | — | — | — | — | — | — |
| Roughness of 3D printing component | | N7 | N7 | N7 | N11 | N10 | N9 | N9 | N9 | N9 | N9 |
| Upper end of 3D printing component | Specific gravity | 1.21 | 1.18 | 1.25 | 1.36 | 1.26 | 1.25 | 1.12 | 1.13 | 1.42 | 1.35 |
| | Tensile strength | 56 | 73 | 51 | 59 | 57 | 56 | 47 | 48 | 65 | 63 |
| Lower end of 3D printing component | Specific gravity | 1.22 | 1.19 | 1.24 | 1.04 | 1.08 | 1.18 | 1.18 | 1.20 | 1.22 | 1.20 |
| | Tensile strength | 56 | 72 | 51 | 46 | 49 | 51 | 52 | 55 | 57 | 57 |

As shown in Table 1, in the Comparative Examples, as the inner diameter of the glass bubble decreased relative to the outer diameter, the thickness of the glass bubble increased and the difference in specific gravity between the glass bubbles and the resin led to positional distribution. As a result, the tensile strength of the lower end tensile strength of the lower end of the printed component was lower than the tensile strength of the upper end (i.e. there was not uniformity of mechanical properties in the printed product).

As also illustrated in Table 1, in the case of Examples in which the specific gravity of the glass bubbles was from 0.8 to 1.2 times that of the resin powder, the component roughness was low compared with Comparative Examples, the specific gravity of the glass bubbles was from 0.9 to 1.1 times, and the specific gravity of the upper end and the lower end of the component was relatively uniform compared with the Comparative Examples, and the tensile strength of the upper end and the lower end of the component was relatively uniform compared with the Comparative Examples.

While example embodiments have been described in detail above, it will be appreciated by those skilled in the art that changes may be made in these embodiments without departing from the principles and spirit of the invention, the scope of which is defined in the appended claims and their equivalents.

What is claimed is:

1. A method of manufacturing a three-dimensional product having uniform mechanical properties using a selective laser sintering 3D printer, the method comprising steps of:

preparing a mixed powder material by mixing resin powder and glass bubbles, wherein a specific gravity of the glass bubbles is from about 0.8 to about 1.2 times that of the resin powder;

supplying the mixed powder material to a 3D printer; and selectively sintering the mixed powder material by irradiating it using a laser based on 3D data of the product to be manufactured, wherein the specific gravity of the glass bubble is adjusted by adjusting a ratio of an outer diameter of the glass bubble and an inner diameter of the glass bubble, and wherein the inner diameter of the glass bubble is 81% to 85% of the outer diameter of the glass bubble.

2. The method of claim 1, wherein the mixed powder is supplied to the 3D printer using a roller.

3. The method of claim 1, wherein the specific gravity of the glass bubble is from about 0.9 to about 1.1 times that of the resin powder.

4. The method of claim 1, wherein the glass bubbles comprise a mixture of glass bubbles having a same outer diameter as the outer diameter of the resin powder and glass bubbles having an outer diameter of from about ⅓ to about ½ of the outer diameter of the resin powder.

5. The method of claim 1, wherein the resin powder is selected from the group consisting of nylon 6, nylon 66, polypropylene, ABS, PLA, PC, and PMMA.

6. The method of claim 1, wherein the outer diameter of the resin powder is from about 2 to about 200 μm.

* * * * *